Aug. 6, 1940.   B. E. HARTER   2,210,169
SELF-LOCKING GAFF
Filed Nov. 17, 1939
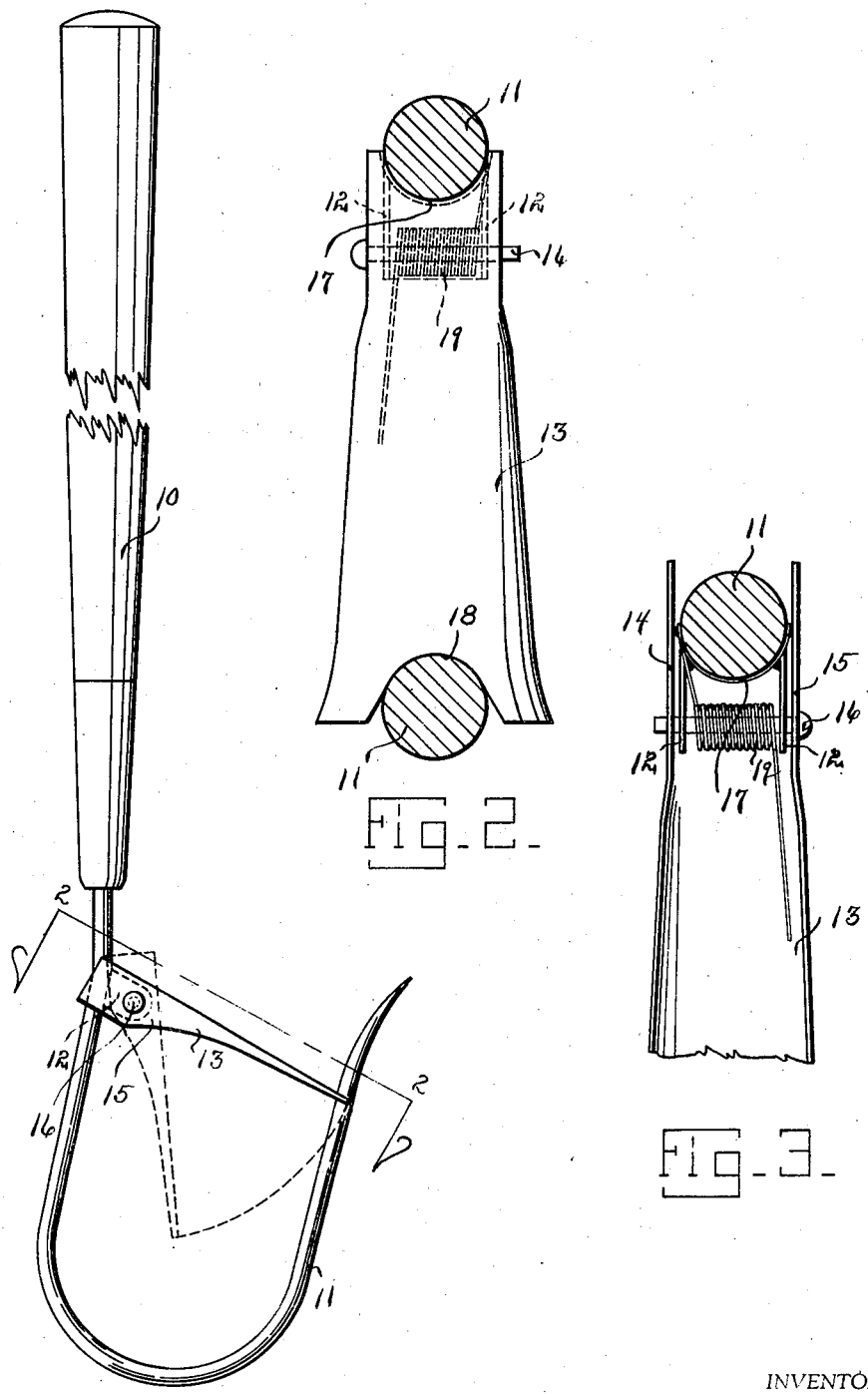
INVENTOR.
B. E. HARTER
BY M. Talbert Dick
ATTORNEY.

Patented Aug. 6, 1940

2,210,169

UNITED STATES PATENT OFFICE 2,210,169

SELF-LOCKING GAFF

Byron E. Harter, Farnhamville, Iowa

Application November 17, 1939, Serial No. 304,926

1 Claim. (Cl. 43—5)

The principal object of this invention is to provide a gaff that will automatically lock after a fish has been hooked, thereby preventing the accidental loss of the fish after it has been so hooked.

A further object of this invention is to provide a self-locking gaff that is under the control of the user at all times.

A still further object of my invention is to provide a self locking gaff that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claim and illustrated in the accompanying drawing, in which:

Fig. 1 is a side view of my gaff.

Fig. 2 is an enlarged view of the lower portion of my gaff taken on line 2—2 of Fig. 1.

Fig. 3 is an enlarged bottom plan view of the rear end portion of the bar latch and more fully illustrates the same.

The employment of a gaff is essential in the catching of many fish. This is especially true when fishing from a boat. In the case of larger fish the line is too small to lift the fish into the boat. In many instances, the fish will be lost during this procedure unless a gaff is used. Also it is dangerous to land a large fish without a gaff as the struggles of the fish may throw the plug or hook into the fisherman. The use, therefore, of gaffs is old, but in most instances the gaffs are not efficient and many fish are lost from them. I have overcome such objections by a self-locking gaff that securely holds the fish until the fisherman desires the release of the fish from the gaff.

Referring to the drawing, I have used the numeral 10 to designate the handle of my gaff having the usual metallic hook portion 11. Obviously these two parts of the gaff are old in the art. I will now describe the features of my gaff that distinguish it from other gaffs. The numeral 12 designates two spaced apart bearing ears on the hook portion 11 just below the handle as shown in Fig. 1. These two ears extend in the direction of the free end portion of the hook portion 11. The numeral 13 designates the latch arm formed of a single piece of sheet metal. The numerals 14 and 15 designate two side flanges on the rear end portion of the member 13, creating an inverted trough construction at the rear end of the latch arm, which embraces the two ears 12 as shown in Fig. 3. The numeral 16 designates a pin extending through the ears 12 and side flanges 14 and 15. By this arrangement the arm 13 is pivoted at its rear end to the shank of the hook portion 11. The latch arm 13 may swing downwardly within the hook portion as shown by dotted lines in Fig. 1, but is limited in its upward swinging movement by its rear end engaging the shank of the hook portion and its free end engaging the inner side of the outer end of the hook. The numeral 17 designates a notch in the rear end of the latch arm to embrace and engage this shank portion of the hook and the numeral 18 designates a notch in the free end of the latch arm for embracing and engaging this outer end portion of the hook as shown in Fig. 2. Obviously these notches 17 and 18 prevent the side or lateral movement of the latch arm relative to the hook portion when the latch arm is in locked position extending downwardly and to the left between the shank and free end of the hook portion. This feature provides great strength when the latch arm is in locked condition and also acts to guide the arm back into proper aligned position from an unlocked or downward position. The numeral 19 designates a coil spring embracing the pin 16 having one end engaging the under side of the latch arm and its other end engaging the shank of the hook portion for yieldingly holding the latch arm in an elevated locked condition. One end of the spring 19 may be bent around the shank of the hook portion to afford better anchorage as shown in Fig. 3.

To use my gaff, it is merely necessary to hook the fish in the usual manner. The weight of the fish will move the trigger latch arm 13 downwardly until the fish moves to the extreme lower loop portion of the hook 11 after which the member 13 will be freed of engagement with the fish and will automatically by the action of the spring 19 move upwardly to a locked elevated position above the hooked fish. Obviously with the member 13 acting as the bar between the shank and pointed end portion of the hook, the fish cannot become accidentally detached from the gaff. With the fish so hooked, it is an easy matter to lift the fish upwardly out of the water, remove the fish hook, plug, or like from the fish, place the stringer on the fish, fasten the stringer if it is not already fastened and then release the fish from the gaff. The removal of the fish from the gaff is a simple matter, as it is merely necessary to manually move and hold the member 19 downwardly to permit the hook part of the gaff to be detached from the fish.

Some changes may be made in the construction and arrangement of my improved automatically locking gaff without departing from the real spirit and purpose of my invention, and it is my intention to cover by my claim any modified forms of structure or use of mechanical equivalents which may be reasonably included within its scope.

I claim:

In a device of the class described, a handle member, a hook member extending from said handle, a bar having its rear end hingedly secured to the shank portion of said hook member, a spring for yieldingly holding said bar in an extended position between the shank portion and free end portion of said hook member, and a notch formed in the rear end of said bar capable of engaging the shank portion of said hook member when the same is in an extended position between said shank portion of said hook member.

BYRON E. HARTER.